Dec. 7, 1965   E. C. SNYDER   3,222,510
PROJECTING COLORED LIGHT
Filed Jan. 18, 1962   2 Sheets-Sheet 1
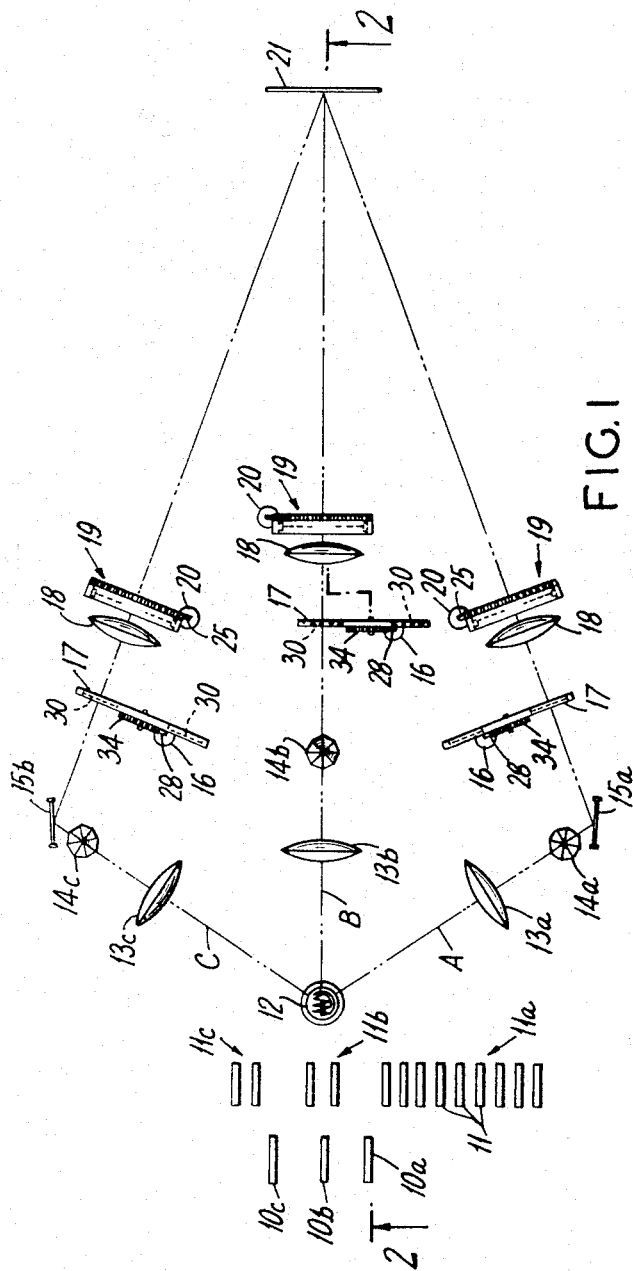
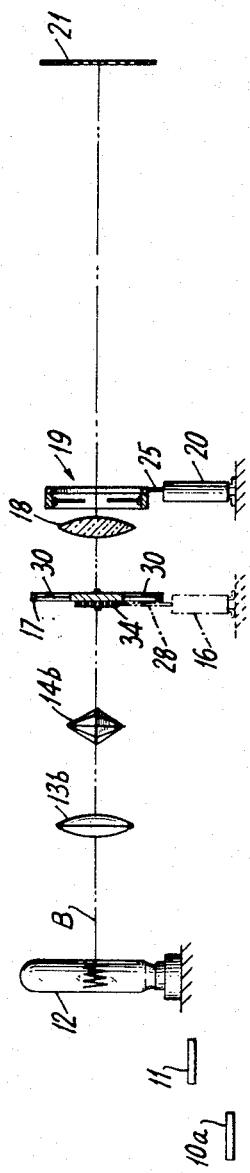
INVENTOR.
EDWARD C. SNYDER
BY
Davis, Hoxie, Faithfull & Hapgood
ATTORNEYS.

Dec. 7, 1965  E. C. SNYDER  3,222,510
PROJECTING COLORED LIGHT
Filed Jan. 18, 1962  2 Sheets-Sheet 2

INVENTOR.
EDWARD C. SNYDER
BY
Davis, Hoxie, Faithfull & Hapgood
ATTORNEYS.

United States Patent Office 3,222,510
Patented Dec. 7, 1965

3,222,510
PROJECTING COLORED LIGHT
Edward C. Snyder, New York, N.Y., assignor of forty percent to Josephine Edgerton Mack, New York, N.Y.
Filed Jan. 18, 1962, Ser. No. 167,046
4 Claims. (Cl. 240—3.1)

The present invention relates to an instrument and method for projecting colored light and more particularly to an improved method and apparatus for showing a plurality of areas which change in color and brilliance in response to a manually operated keyboard. The product of this type of instrument is sometimes called "color music."

The present invention provides a projector which focuses a plurality of colored areas on a screen or a wall. The color, and preferably the brilliance of the areas, changes in response to manual operation of a keyboard. The original cost of the instrument and its operating cost are relatively low and its size is relatively small so that the instrument is practical for use in the home.

According to the present invention, I provide an instrument having a plurality of keys to control the color of the projected areas, a color control means, and an optical projection system. The optical system of the instrument includes a single source of light and a plurality of focusing means to create a plurality of non-parallel light beams. The color changing means is responsive to the playing of the keys and is positioned in the path of each light beam. The instrument also preferably includes a plurality of keys to control the projected area's intensity or brilliance and a diaphragm responsive to those intensity control keys in the path of each light beam.

Other features of the present invention will be apparent from the following detailed description of a preferred embodiment, taken in conjunction with the accompanying drawing, in which:

FIG. 1 is a top diagrammatic view of a preferred embodiment of the present invention including the keys, optical system, lenses, crystals, mirrors, color control means, intensity control means and screen;

FIG. 2 is a side view taken along lines 2—2 of FIG. 1;

Figure 3:
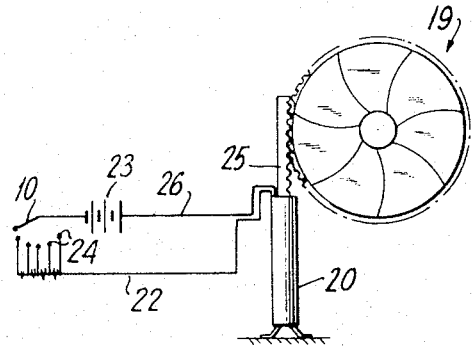
FIG. 3 is a front elevational view of the iris diaphragm and its control circuit.

In FIGS. 1 and 2, three groups of color keys 11a, 11b and 11c are arranged in a row. There are twelve keys in each group and these keys 11 are of the spring-loaded return type, such as is found in pianos. The three intensity keys 10a, 10b and 10c are likewise arranged in a row and are also of the spring-loaded return type.

38  SCHOOFF → 81270    Patents Night    Nov. 16
The keys 10 and 11 are arranged on an exterior keyboard of a cabinet (not shown). The optical system is positioned inside the cabinet and includes a single high intensity light source 12, for example a removable 300 watt electric bulb. The light source 12 is chosen, especially in an instrument for home use, so as to not require an auxiliary cooling blower, although for clarity in projection a larger source may be used along with a simple fan driven cooling blower (not shown). Even if the instrument is used in a large hall it is still advantageous, in terms of simplicity of the system and in order to minimize heat, that a single source of light be utilized. The light from the source 12 is gathered into three beams A, B and C by condensing lenses 13a, 13b and 13c, respectively. The beams A, B and C pass through clear glass crystals 14a, 14b and 14c, respectively, to form beams having interesting outlines and internal light and dark areas. Those beams, in FIGS. 1 and 2 beams A and C, which are at an angle to the screen 21 are turned by reflection in mirrors 15a and 15b so that they are directed to the screen 21.

The beams A, B and C each then pass through a color control means comprising a relay 16 and a color wheel 17 attached to the ratchet arm of the relay. The wheel has a plurality of different colored transparent discs which may be, for example, colored glass, stained gelatine or colored plastic. The relay 16 indexes wheel 17 under control of keys 11 so that the beam obtains the desired color. The beams are each then directed through a condensing lens 18 and then through a beam intensity control comprising a solenoid 20 and an iris diaphragm 19, a masking device having a circular opening. The size of the iris opening is controlled by the solenoid.

In FIG. 13 the beam intensity control means is shown in greater detail and consists of key 10, which is a multiposition switch arm, a plurality of contacts 24 having a series of resistances between them, a wire 22 connecting the contacts to D.C. solenoid 20, and a return wire 26 connected to a D.C. potential 23 whose other end is connected to key 10. The plunger (ratchet) 25 of solenoid 20 is extended and retracted in degrees by contact of key 10 with contacts 24. Movement of the plunger determines the opening of the camera-type iris diaphragm 19. Control of the brilliance of the projected areas permits a greater expression of rhythmic changes. Preferably the intensity control is used for rhythm and so the key is mounted for rapid changes of position.

Figure 4:
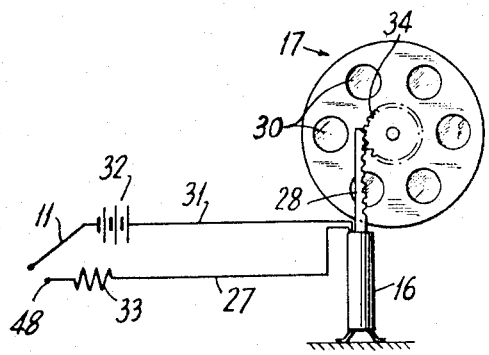
FIG. 4 is a front elevational view of the color wheel and its control circuit.

As seen in FIG. 4, the color control means consists of spring-returnable key 11 which, when depressed, makes electrical contact by touching contact 48. The color control circuit also includes, in series, the fixed resistance 33, the wire 27, the relay (solenoid) 16, the wire 31, and the D.C. potential source 32. The plunger (ratchet) 28 of solenoid 16 has gear teeth on one of its sides and extends in response to closing the circuit. The extension depends upon the value of resistance 33 so that each key in the group 11a, for example, has a different resistance value in its circuit. Extension of plunger 28 rotates color wheel through a gear wheel 34 fixed to the color wheel to bring a pre-selected disc 30, having a transparent colored material, in the path of a light beam.

As an example of the operation of the apparatus, the player turns on the light source 12 and the power and in response to a score indicating lighting effects, or in accompaniment to music, or spontaneously, and depresses keys 11a, 11b and 11c to select the color of the projected beams A, B and C, respectively, and plays keys 10a, 10b and 10c to vary the intensity of those beams.

Figure 5:
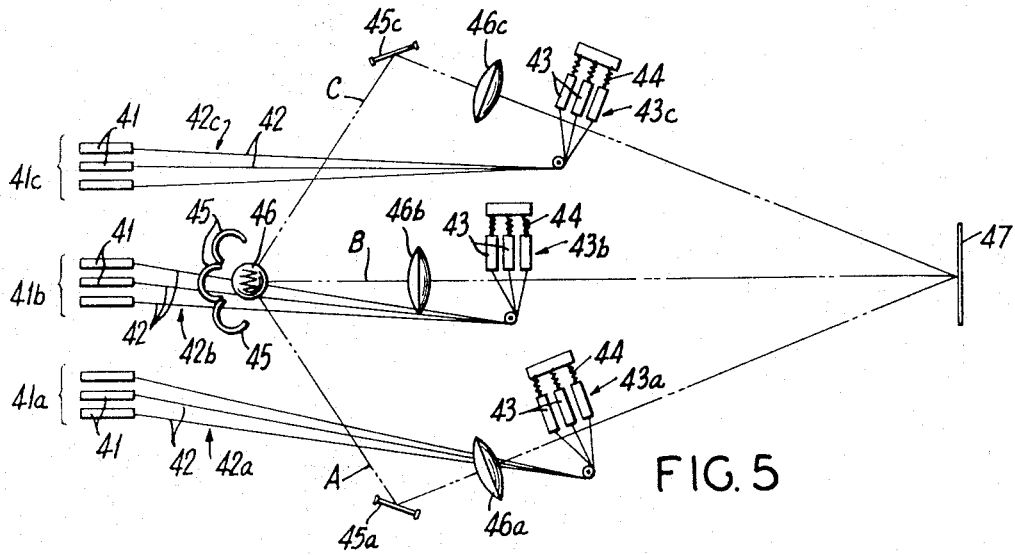
FIG. 5 is a top diagrammatic view of another embodiment of the present invention.

The simple mechanical instrument of FIG. 5 consists of three sets of keys 41a, 41b and 41c with each set having three pivotable keys. The keys are connected at one of their ends to sets of string 42a, 42b and 42c, with one string attached to each key. The other end of the strings are connected to groups of flat segments 43a, 43b and 43c, with three different colored segments in each group and with each string being attached to a different segment. Preferably, however, twelve keys and twelve segments should be used for a full range of color display. The segments are spring-loaded, pivoted, colored and transparent. The keys 41 are pulled back to their normal position after their release by the player by the springs 44 connected to the segments 43. Three parabolic mirrors 45 gather light from light source 46 into three beams A, B and C. Beams A and C are reflected from flat angularly positioned mirrors 45a and 45c, respectively. The three light beams are then focused by condensing lenses 46a, 46b and 46c. The beams are then directed through those colored segments 43 which are pulled out by depression of keys 41. The colored beams A, B and C are then projected on wall or screen 47.

As an alternative to the use of strings 42, the keys may each be pivotally attached to a rod to which a transparent segment 43 is secured. Depression of a key raises its rod and thereby raises its segment into the light beam. If the light is reflected from a straight mirror, a compact instrument may be built by using the keys and rods. An iris diaphragm as an intensity control means can be utilized in a mechanical system by controlling the opening by a mechanical linkage from the keyboard. For example, the color control keys are positioned above a single diaphragm control bar which is linked by a rod to the iris. The degree to which the diaphragm is opened depends upon the extent to which the color keys are depressed.

Figure 6:
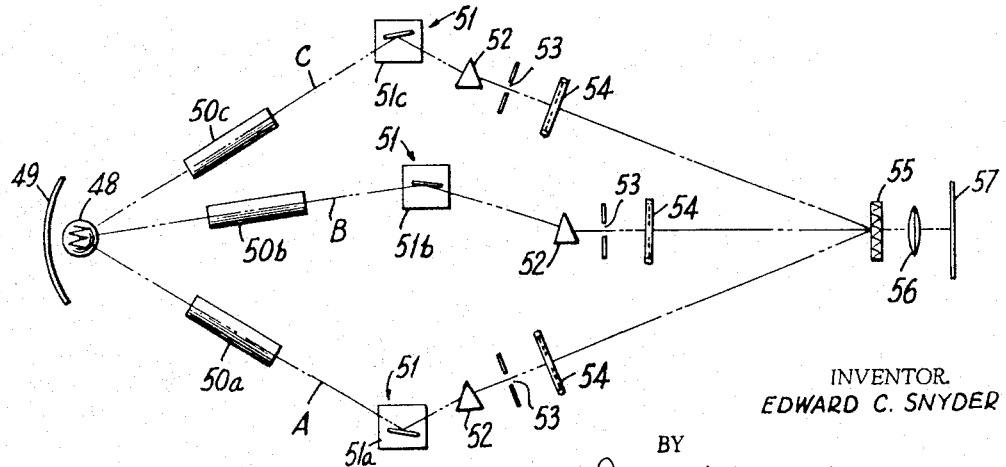
FIG. 6 is a top diagrammatic view of still another embodiment.

As another alternative, the white light beams may be colored by passing them through a dispersion prism and then through an openable slit. The size of the slit is controlled by the keyboard. In the embodiment of FIG. 6 light from source 48 is reflected from curved mirror 49 and formed into three non-parallel beams A, B and C by collimating tubes 50a, 50b and 50c respectively. Each of the beams then is reflected upon the mirror of a galvanometer type instrument 51. These instruments (of the d'Arsonval galvanometer optical lever torsion suspension type) 51a, 51b and 51c have mirrors mounted upon the armature so that current applied to their coils rotates the mirrors a few degrees to change the path of the reflected beam. The beams each then pass through the following instruments: dispersion prisms 52 (which form color spectrums), fixed slits 53 in an opaque body, and either manually or electrically adjustable iris diaphragms 54. The beams A, B, C all then pass through the single crystal 55 and the single focusing lens 56 and are projected upon screen 57. The keys (not shown), as in the device of FIG. 1, send a predetermined current signal to the galvanometers 51 to thereby change the beam path. The changed path alters the position of the spectrum. The slits 53 are sufficiently narrow so as to permit only part of the total spectrum to pass, so that shifts of the position of the spectrum results in different colors passing through slits 53, diaphragms 54, etc. The use of the single lens 56 permits an economical and easily focusable instrument.

The present invention, by limiting the light source to a single bulb, minimizes current consumption, initial cost and repair. A plurality of bulbs would increase the heat and necessitate expensive auxiliary cooling means. By utilizing one bulb and producing a plurality of controlled colored light beams, an interesting and practical home instrument is provided.

I claim:
1. Apparatus for the projection of a plurality of separate and colored light beams including a keyboard having a plurality of manually operable keys, a single source of light, a plurality of light focusing means for focusing a plurality of light beams from the source at angles to each other, color control means in the path of each focused light beam to control the color of the light beam, means connecting each key to a corresponding color control means, and means in the path of each focused light beam to distort the beam so that the image projected by each beam has a textured appearance.

2. Apparatus as in claim 1 in which the keyboard also has a plurality of manually operable beam intensity control keys and a plurality of beam intensity control means, each such means being positioned in the path of a light beam to change the intensity of the beam, and means connecting each beam intensity control key to a beam intensity control means.

3. Apparatus as in claim 2 in which the connecting means is a wire of an electrical circuit, whereby a beam intensity key closes the circuit and the circuit operates the beam intensity means; and in which the beam intensity means includes an electromagnetic relay, an iris diaphragm and a mechanical connection between the relay and the diaphragm.

4. Apparatus as in claim 1 in which the color control means comprises an electromagnetic relay, a color wheel having a plurality of different colored transparent areas, and means connecting the relay and the wheel; and in which apparatus the keys each place an electrical signal on the circuit of the electromagnet.

References Cited by the Examiner
UNITED STATES PATENTS

| 1,591,211 | 7/1926 | Brenkert et al. | 240—46.13 |
| 1,738,942 | 12/1929 | Brenkert et al. | 240—3.1 X |
| 1,871,794 | 8/1932 | Hough | 240—3.1 |
| 2,423,322 | 7/1947 | Hurley | 240—46.11 |

FOREIGN PATENTS 840,407  7/1960  Great Britain.

NORTON ANSHER, *Primary Examiner.*
EVON C. BLUNK, *Examiner.*